(12) United States Patent
Plant

(10) Patent No.: US 7,419,214 B2
(45) Date of Patent: Sep. 2, 2008

(54) LOUNGE SEATING ARRANGEMENT

(75) Inventor: Tommy George Plant, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/466,144

(22) Filed: Aug. 22, 2006

(65) Prior Publication Data

US 2007/0040434 A1    Feb. 22, 2007

Related U.S. Application Data

(60) Provisional application No. 60/595,975, filed on Aug. 22, 2005.

(51) Int. Cl.
*A47C 15/00* (2006.01)
*B64D 11/06* (2006.01)

(52) U.S. Cl. ............... 297/245; 297/354.13; 244/118.6; 244/122 R

(58) Field of Classification Search .................. 297/245, 297/354.13; 5/9.1, 18.1; 244/122 R, 118.5, 244/118.6
See application file for complete search history.

(56) References Cited

U.S. PATENT DOCUMENTS

| 2,414,730 | A | | 1/1947 | Flogaus |
|---|---|---|---|---|
| 2,947,349 | A | | 8/1960 | Kryter |
| 5,795,025 | A | * | 8/1998 | Murphy ............... 297/411.36 X |
| 5,954,401 | A | | 9/1999 | Koch et al. |
| D421,948 | S | | 3/2000 | Dryburgh et al. |
| 6,059,364 | A | * | 5/2000 | Dryburgh et al. ... 297/354.13 X |
| 6,692,069 | B2 | * | 2/2004 | Beroth et al. ............... 297/118 |
| 7,025,306 | B2 | * | 4/2006 | Saint Jalmes ........ 244/122 R X |
| 7,178,871 | B1 | * | 2/2007 | Round et al. ............ 297/244 X |
| 2001/0015566 | A1 | * | 8/2001 | Park et al. .................... 297/115 |
| 2004/0232283 | A1 | | 11/2004 | Ferry et al. |

FOREIGN PATENT DOCUMENTS

| FR | 647809 | 12/1928 |
|---|---|---|
| GB | 2362095 A | 11/2001 |

\* cited by examiner

*Primary Examiner*—Anthony D. Barfield
(74) *Attorney, Agent, or Firm*—Adams Intellectual Property Law, P.A.

(57) ABSTRACT

A passenger seating arrangement includes a first seat unit, facing in a first direction; a first ottoman having a first support surface positioned to receive the feet of a passenger seated in the first seat unit; a second seat unit facing in a second direction generally opposite to the first direction; and a second ottoman disposed laterally adjacent to the first ottoman and having a second support surface positioned to receive the feet of a passenger seated in the second seat unit.

18 Claims, 4 Drawing Sheets

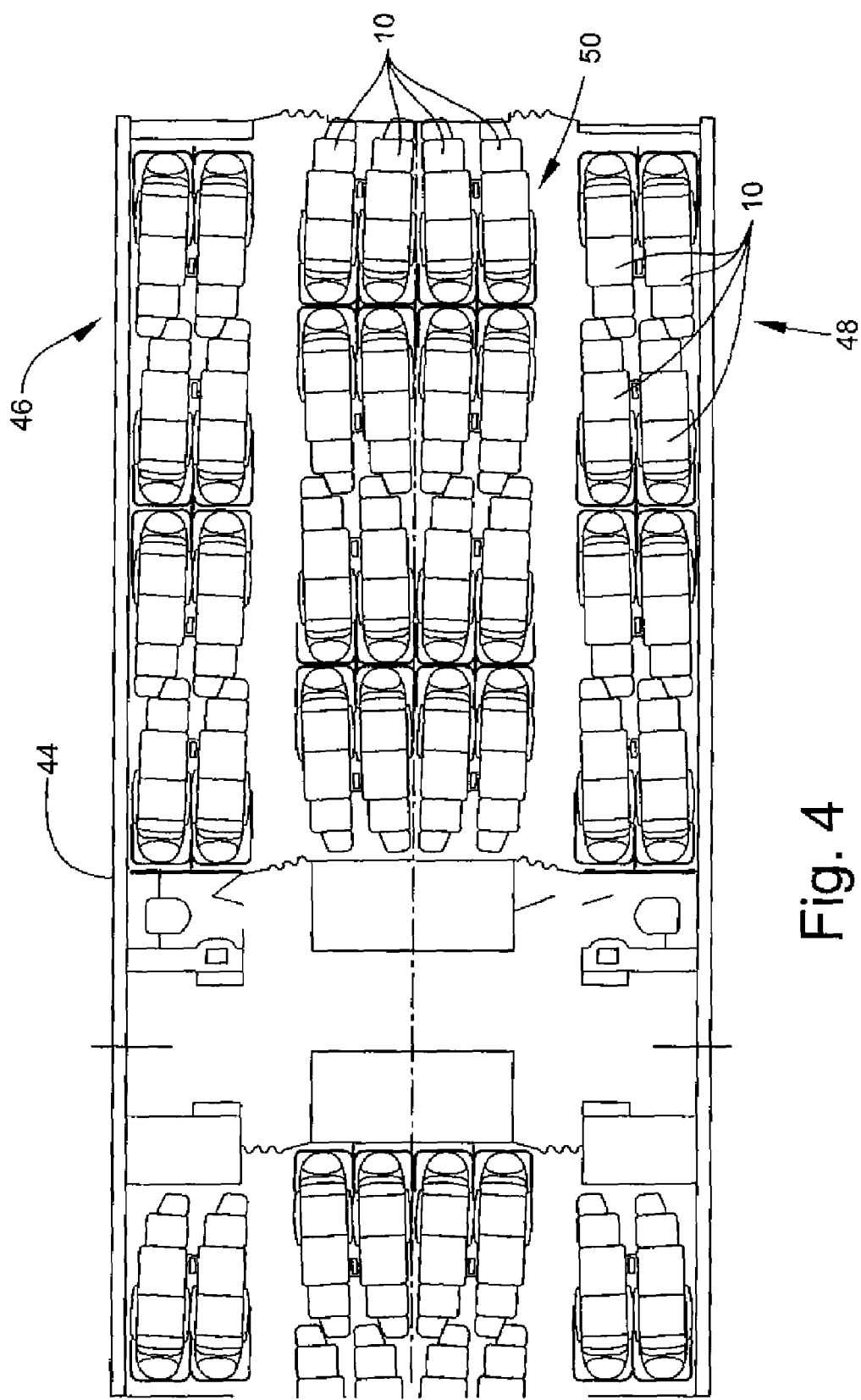

LOUNGE SEATING ARRANGEMENT

BACKGROUND OF THE INVENTION

This invention relates to passenger seating, and more particularly to an angled lounge seating arrangement.

Long-haul aircraft flights regularly fly non-stop to destinations 12-18 hours or more away from the origination point. At present, first class cabins provide various forms of "sleeper seats", meaning that the seat back reclines to the point where the seat occupant is able to attain a prone or nearly-prone position. In some cases the seats form a horizontal sleeping surface, and in other cases the head end of the reclined seat is raised to some degree above the foot end. The seats are generally parallel with the center line axis of the aircraft. The seats are also traditionally forward facing in nature.

While such seats provide good passenger comfort, there are deficiencies in this arrangement. Because aircraft operating costs are directly linked to the physical size and attendant aerodynamic draft of the fuselage, it is desirable to make the cabin as small as possible. Prior art sleeper-type seats consume a large amount of space within the aircraft cabin.

BRIEF SUMMARY OF THE INVENTION

Accordingly, it is an object of the invention to provide a passenger seating arrangement which provides a comfortable sleeping position to a passenger seated therein while minimizing the space consumed within an aircraft cabin.

This and other objects are addressed by the present invention, which according to one aspect provides a passenger seating arrangement including: a first seat unit, facing in a first direction; a first ottoman having a first support surface positioned to receive the feet of a passenger seated in the first seat unit; a second seat unit facing in a second direction generally opposite to the first direction; and a second ottoman disposed laterally adjacent to the first ottoman and having a second support surface positioned to receive the feet of a passenger seated in the second seat unit.

According to another aspect of the invention, each of the seat units includes: a seat back; a seat bottom; and a leg rest. At least the seat back and the leg rest are moveable, such that the seat unit can move between an upright seating configuration and a fully reclined sleeping configuration.

According to another aspect of the invention, each of the seat units includes a leg rest moveable between: a lowered position; and a raised position in which the leg rest and the support surface of the ottoman form a substantially continuous support.

According to another aspect of the invention, each of the seat units includes a pair of laterally spaced-apart arm rests, each arm rest being moveable between a lowered position and raised position.

According to another aspect of the invention, the passenger seating arrangement further includes a privacy shell at least partially surrounding at least one of the first and second seat units, the privacy shell configured to permit a seat occupant to see over and around the privacy shell when sitting upright, but to be shielded from view from the sides when in other positions.

According to another aspect of the invention, the passenger seating arrangement further includes an upwardly-extending partition disposed between the first and second ottomans and adapted to prevent passengers in opposed seat units from viewing each other.

According to another aspect of the invention, the first and second seat units have respective first and second central axes which are generally parallel to and spaced apart from each other.

According to another aspect of the invention, a passenger seating is provided for a vehicle having a longitudinal axis. The seat arrangement includes: a first seat unit facing in a first direction and having a first central axis; a first ottoman having a first support surface for receiving the feet of a passenger seated in the first seat unit; a second seat unit facing in second direction generally opposite to the first direction and having a second central axis; and a second ottoman disposed laterally adjacent to the first ottoman and having a second support surface for receiving the feet of a passenger seated in the second seat unit. The first and second central axes are spaced apart from each other and are each disposed at a non-parallel angle to the longitudinal axis of the vehicle.

According to another aspect of the invention, an overall length consumed by the first and second seat units plus their associated ottomans is less than the sum of the individual lengths of the seat units plus their associated ottomans.

BRIEF DESCRIPTION OF THE DRAWINGS

The subject matter that is regarded as the invention may be best understood by reference to the following description taken in conjunction with the accompanying drawing figures in which:

FIG. 4 is a top plan view of another exemplary cabin arrangement.

DETAILED DESCRIPTION OF THE INVENTION

Figure 1:
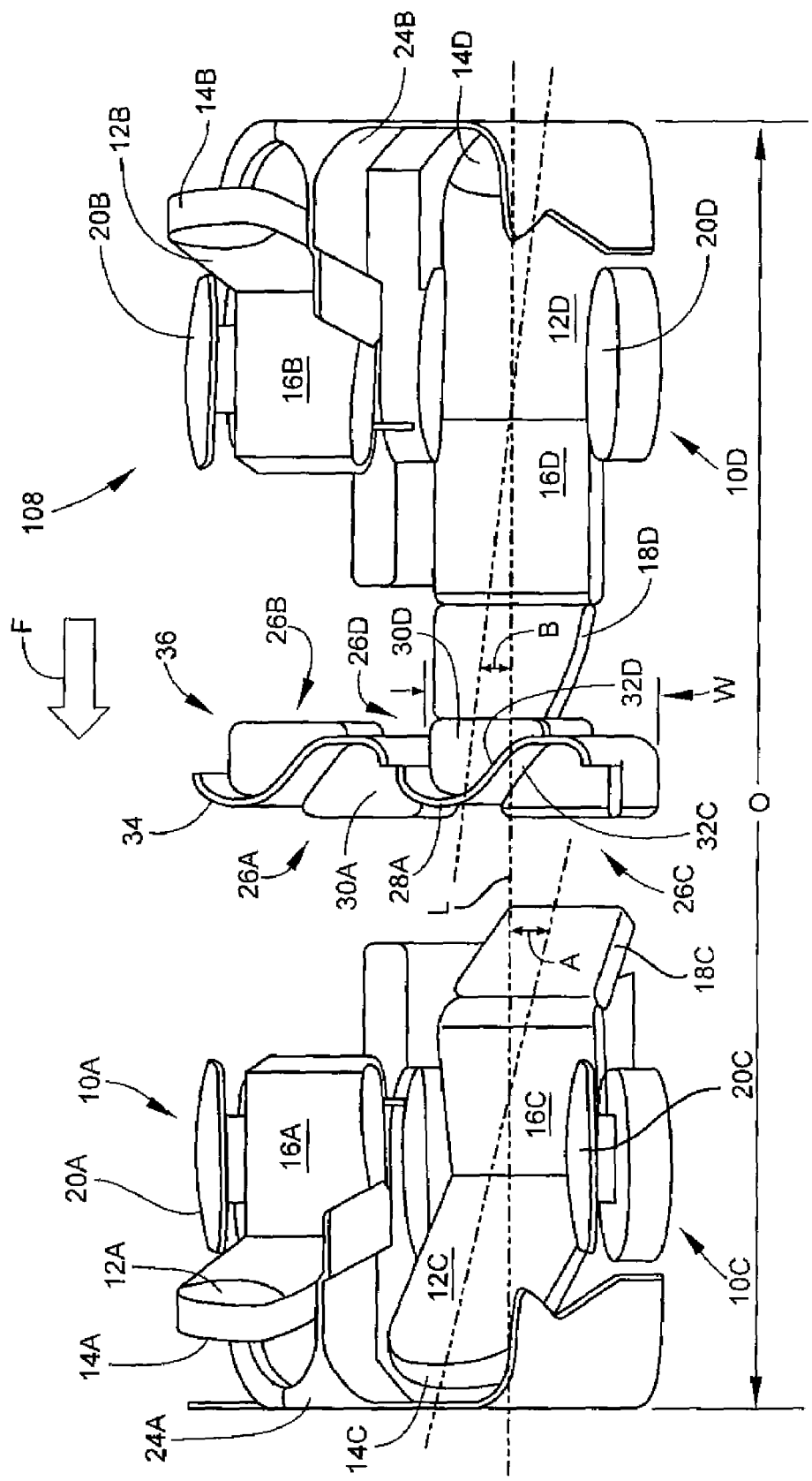
FIG. 1 is a schematic perspective view of a group of passenger seats constructed according to the present invention.

Referring to the drawings wherein identical reference numerals denote the same elements throughout the various views, FIG. 1 illustrates a group of passenger seat units 10A-10D. The seat units 10A-10D are substantially identical to each other, and include, respectively, seat backs 12A-12D (the upper portions of which define separate or integral headrests 14A-14D) seat bottoms 16A-16D, leg rests 18A-18D, and spaced-apart arm rests 20A-20D. The arm rests 20 may be moveable between a lowered position, as shown at 20D, and a raised position, shown at 20C. The seat units 10A-10D are supported by frames which are in turn mounted to the deck of the aircraft by track fittings or other suitable hardware of a known type.

Privacy shells 24A and 24B are provided which enclose the back and sides of the seat backs 12. The privacy shells 24 are configured to permit the occupant to see over and around the shells 24 when sitting upright, but to be shielded from view from the sides when in other positions.

The seat units 10A-10D have ottomans 26A-26D associated therewith. Each ottoman 26 has an elevated base 28 and a support surface 30 for receiving a passenger's feet in certain seating positions described in more detail below. As shown in the illustrated example, the ottoman 26C has a width that is somewhat less than that of the associated leg rest 18C. The ottoman 26C is offset to one side relative to a longitudinal centerline of the associated seat unit 10C, and has an angled side edge 32C which complements an angled side edge 32D of the adjacent ottoman 26D. A similar relationship applies to the other ottomans 26A and 26B Each seat unit 10 is provided with appropriate moveable components, actuators, and controls to enable a passenger seated therein to put the seat unit 10 into various configurations including an upright or "seated" configuration, a fully reclined "lie-flat" or "sleeping" configuration in which the seat unit 10 serves as a bed, and a number of intermediate configurations.

In FIG. 1, seat units 10A and 10B are shown in the upright position for landing and takeoff, dining, working and video viewing. The leg rests are folded down, the seat bottoms 16A and 16B are generally horizontal and translated as far rearward as possible (in cases where they are moveable), and the seat backs 12A and 12B are substantially upright.

Seat unit 10C is shown in a partially reclined position, with the seat back 12C is angled rearward. In this position the occupant is supported along the entire body length in a comfortable semi-reclining position with the head elevated above the rest of the body and with the legs comfortably flexed at the knees.

Seat unit 10D is shown in a fully reclined "lie-flat" or "sleeping" position. The occupant is permitted to fully recline, with the head only very slightly above the remainder of the body. In this position, the support surface 30D of the ottoman 26D is aligned with plane of the leg rest 18D, seat back 12D, and seat bottom 16D to collectively form a sleeping surface.

The seat units 10 are uniquely configured so as to maximize usage of space within the cabin of the aircraft. This configuration will be described with respect to seat units 10C and 10D, with the understanding that seat units 10A and 10B are configured in an identical relationship. In the illustrated example, the seat unit 10D faces forward, as noted by the arrow "F", while the seat unit 10C faces aft. The central axis of each of the seat units 10 is disposed at an angle with respect to the longitudinal axis "L" of the aircraft. The central axes of the seat units 10C and 10D are thus spaced-apart from each other. The seat unit 10C is disposed at a first angle "A" while the seat unit 10D is disposed at a second angle "B". The magnitudes of angles "A" and "B" may be equal or different. In the illustrated example the central axes of the seat units 10C and 10D are generally parallel. The effect of the angling is to offset the associated ottomans 26C and 26D in a lateral direction, so they can be positioned in a side-by-side arrangement. The shape and relative width of the ottomans 26 described above help to effectuate this side-by-side positioning. With this configuration, the total width "W" consumed at the axial position of the ottomans 26C and 26D is only slightly greater than the maximum width of a single seat unit 10. Furthermore, the overall length "O" consumed by the seat units 10C and 10D plus their associated ottomans 26C and 26D, when offset or "telescoped" in this manner, is less than the sum of the individual lengths of the seat units 10C and 10D plus their associated ottomans 26C and 26D.

This same positioning principle may be applied to other portions of the seat units 10 as well. For example, by angling the seat units 10 to a greater degree, the leg rests 18 may be disposed in the side-by-side configuration described with respect to the ottomans 26.

As shown in FIG. 1, several ottomans 26 are grouped together within an integral divider unit 34 which functions to separate the passengers from each other. The divider unit 34 includes an upwardly-extending partition 36 which can be sized to prevent passengers in opposed seat units 10 from viewing each other. The divider unit 34 may also include service features for the individual passengers such as television or video monitors, storage for small articles, food trays, and the like.

Figure 2:
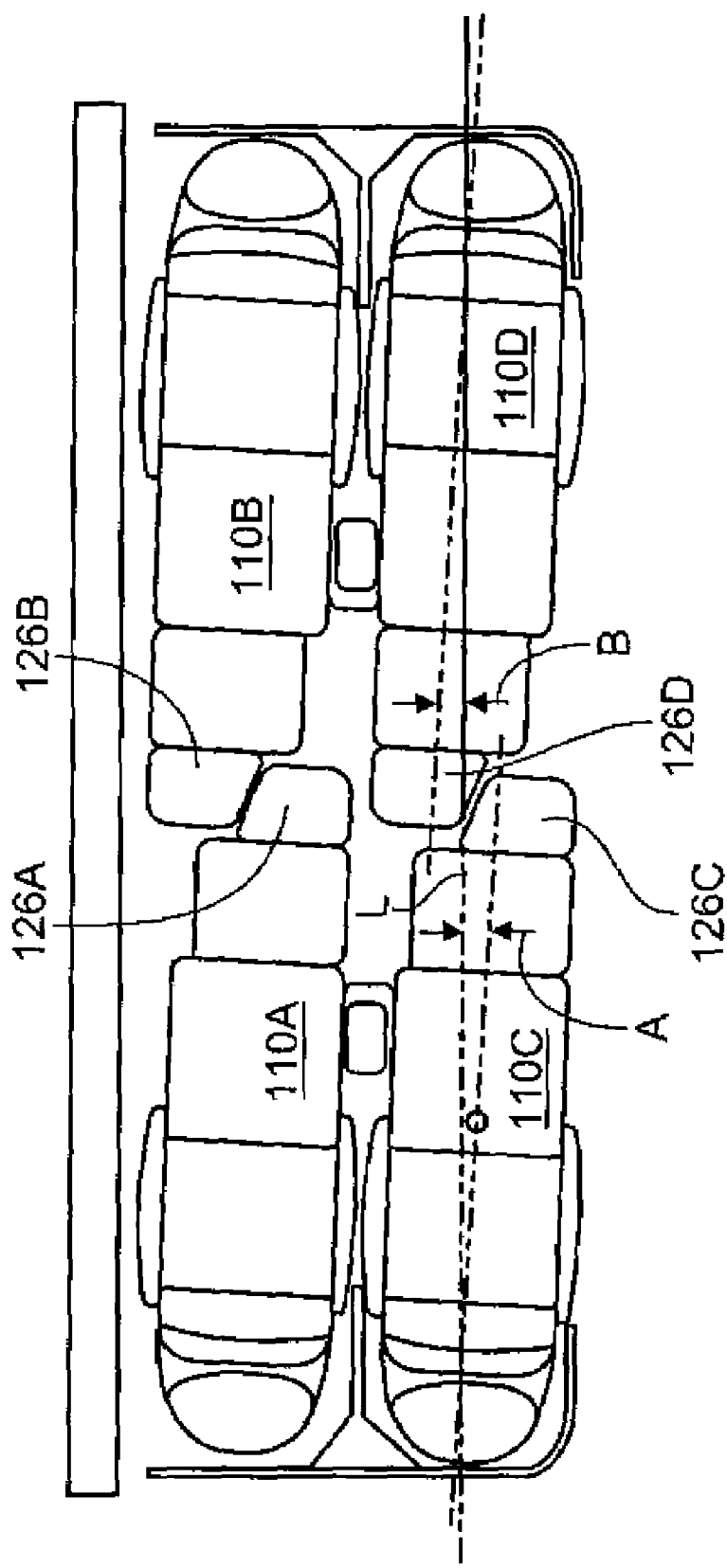
FIG. 2 is a schematic overhead view of an alternative grouping of passenger seats.

FIG. 2 illustrates a group of seat units 110A-110D which are substantially similar to 10A-10D in construction, the primary difference being the lack of the divider unit 34 described above. In this configuration, ottomans 126A-126D are placed directly side-by-side without any intervening structure. This configuration provides less privacy to the individual passengers, but increases the efficiency of space usage.

Figure 3:
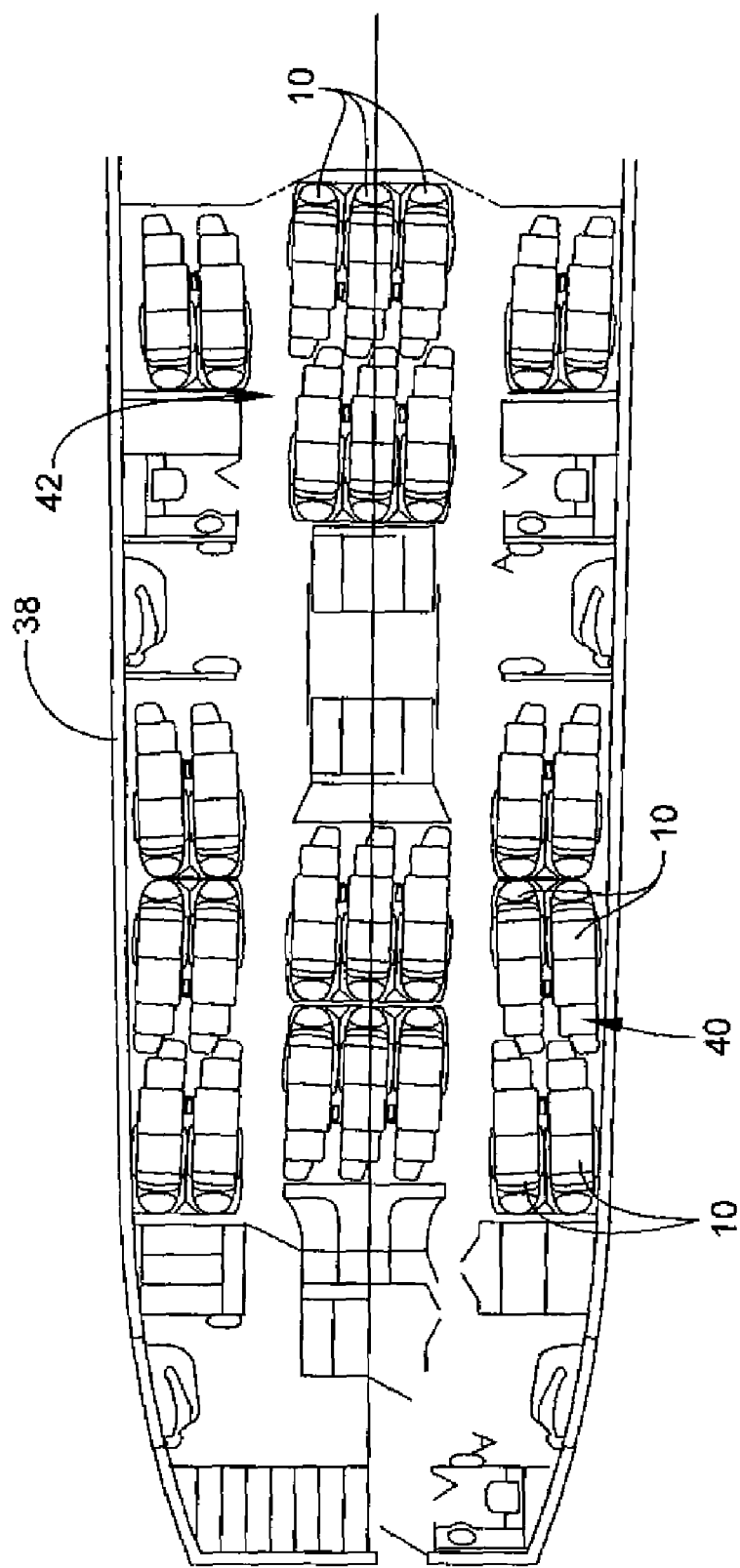
FIG. 3 is a top plan view of an exemplary cabin arrangement.

FIG. 3 illustrates a first example of how the seat units 10 described above may be disposed in an aircraft cabin 38. In this arrangement, several of the seat units 10 are placed in the angled fore-and-aft pairs described above. A number of these angled pairs can be replicated throughout the cabin 38. For example, two pairs of seat units 10 are placed side-by-side in area 40, while three pairs of seat units 10 are placed side-by-side in area 42.

FIG. 4 illustrates another aircraft cabin 44 with an alternative arrangement of seat units 10. The cabin contains a number of groups of angled fore-and-aft pairs of seat units 10 as described with respect to FIG. 3, shown at the areas labeled 46, which are angled to the right side of the cabin 44. There are also a number of groups of seat unit pairs, shown at areas labeled 48, that are angled towards the left side of the cabin 44. The combination of "left" and "right" angled seat pairs provides a more symmetrical appearance to the cabin 44, which is particularly noticeable in the central grouping labeled 50. It should be noted that a number of different specific cabin arrangements are possible while incorporating the angled and offset configurations described above, and that these configurations are equally applicable to other types of vehicles besides aircraft.

The foregoing has described a passengers seating arrangement having angled and offset sleeper seat units. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A passenger seating arrangement comprising:
   a first seat unit configured in a substantially forward-facing direction;
   a first ottoman having a first support surface positioned to receive the feet of a passenger seated in the first seat unit;
   a second seat unit configured in a substantially aft-facing direction generally opposite to the substantially forward-facing direction of the first seat unit, the first seat unit and the second seat unit arranged in a column of single seats in a fore-and-aft direction along a longitudinal axis with the first and second seat units defining respective first and second central axes that are spaced-apart and each disposed at a non-parallel angle with respect to the longitudinal axis; and
   a second ottoman disposed proximate and laterally adjacent to the first ottoman and having a second support surface positioned to receive the feet of a passenger seated in the second seat unit such that the first and second ottomans are positioned in a side-by-side arrangement.

2. passenger seating arrangement of claim 1 wherein each of the seat units includes:
   a seat back;

a seat bottom; and a leg rest;

at least the seat back and the leg rest being moveable, such that the seat unit can move between an upright seating configuration and a fully reclined sleeping configuration.

3. passenger seating arrangement of claim 1 wherein each of the seat units includes a leg rest moveable between:

a lowered position; and a raised position in which the leg rest and the support surface of the ottoman form a substantially continuous support.

4. The passenger seating arrangement of claim 1 further comprising a privacy shell at least partially surrounding at least one of the first and second seat units.

5. The passenger seating arrangement of claim 1 further comprising an upwardly-extending partition disposed between the first and second ottomans.

6. A passenger seating arrangement for a vehicle, the seat arrangement comprising:

a first seat unit configured in a generally forward-facing direction and having a first central axis;

a first ottoman having a first support surface for receiving the feet of a passenger seated in the first seat unit;

a second seat unit configured in a generally aft-facing direction substantially opposite to the forward-facing direction of the first seat unit and having a second central axis; and a second ottoman disposed proximate and laterally adjacent to the first ottoman and having a second support surface for receiving the feet of a passenger seated in the second seat unit;

wherein the first seat unit and the second seat unit are arranged in a column of single seats in a fore-and-aft direction along a longitudinal axis that is not parallel to the first central axis or the second central axis; and wherein the first and second central axes are angled with respect to the longitudinal axis and the respective first and second ottomans are offset laterally in a side-by-side arrangement so that an overall width consumed by the first and second ottomans is about the same as a width of one of the first and second seat units.

7. The passenger seating arrangement of claim 6, wherein an overall length consumed by the first and second seat units and their respective ottomans is less than the sum of the individual lengths of the first and second seat units and their respective ottomans.

8. passenger seating arrangement of claim 6 wherein each of the seat units includes:

a seat back;

a seat bottom; and a leg rest;

at least the seat back and the leg rest being moveable, such that the seat unit can move between an upright seating configuration and a fully reclined sleeping configuration.

9. passenger seating arrangement of claim 6 wherein each of the seat units includes a leg rest moveable between:

a lowered position; and a raised position in which the leg rest and the support surface of the ottoman form a substantially continuous support.

10. The passenger seating arrangement of claim 6 further comprising a privacy shell at least partially surrounding at least one of the first and second seat units.

11. The passenger seating arrangement of claim 6 further comprising an upwardly-extending partition disposed between the first and second ottomans.

12. The passenger seating arrangement of claim 6 wherein the first and second central axes are parallel to each other.

13. A lounge seating arrangement for an aircraft comprising:

a first seat unit arranged in a first direction;

a first ottoman having a first support surface positioned to receive the feet of a passenger seated in the first seat unit;

a second seat unit arranged in a second direction about 180 degrees opposite to the first direction of the first seat unit; and a second ottoman disposed proximate and laterally adjacent to the first ottoman and having a second support surface positioned to receive the feet of a passenger seated in the second seat unit;

wherein the first and second seat units are arranged in a column of single seats along a longitudinal axis that extends between respective centers of the first and second seat units; and wherein the first and second ottomans overlap one another in the direction of the longitudinal axis in a side-by-side arrangement and define an overall width that is about the same as a width defined by one of the first and second seat units.

14. The lounge seating arrangement of claim 13 wherein an overall length consumed by the first and second seat units and their respective ottomans is less than the sum of the individual lengths of the first and second seat units and their respective ottomans.

15. The lounge seating arrangement of claim 13 wherein the first seat unit is substantially forward-facing and the second seat unit is substantially aft-facing.

16. The lounge seating arrangement of claim 13 further comprising a privacy shell at least partially surrounding at least one of the first and second seat units.

17. The lounge seating arrangement of claim 13 further comprising an upwardly-extending partition disposed between the first and second ottomans.

18. The lounge seating arrangement of claim 13 wherein the first and second seat units have respective first and second central axes which are generally parallel to and spaced apart from each other.

* * * * *